United States Patent [19]

McKee et al.

[11] Patent Number: 5,018,837
[45] Date of Patent: May 28, 1991

[54] ENHANCED CONTRAST LIQUID CRYSTAL DISPLAY DEVICE

[75] Inventors: John M. McKee, Hillsboro Beach; Joseph T. Downey, Coral Springs, both of Fla.

[73] Assignee: Motorola, Inc., Schaumburg, Ill.

[21] Appl. No.: 375,075

[22] Filed: Jul. 3, 1989

[51] Int. Cl.$^5$ .............................................. G02F 1/13
[52] U.S. Cl. ..................... 350/345; 350/334; 350/337; 350/338; 350/339 D
[58] Field of Search ........... 350/334, 337, 338, 339 D, 350/345

[56] References Cited

U.S. PATENT DOCUMENTS

| | | | |
|---|---|---|---|
| 4,167,307 | 9/1979 | Cirkler et al. | 350/338 |
| 4,249,801 | 2/1981 | Masubuchi | 350/338 |
| 4,264,147 | 4/1981 | Baur et al. | 350/339 D |
| 4,405,210 | 9/1983 | Baur et al. | 350/337 |
| 4,747,672 | 5/1988 | Yasuhara et al. | 350/345 |
| 4,838,661 | 6/1989 | McKee et al. | 350/339 D |

FOREIGN PATENT DOCUMENTS

| | | | |
|---|---|---|---|
| 0005188 | 11/1979 | European Pat. Off. | 350/337 |
| 60-202425 | 10/1985 | Japan | 350/337 |

OTHER PUBLICATIONS

Young, "Combination Reflective/Transmissive Liquid Crystal Display"; IBM Technical Disclosure Bulletin, vol. 15, No. 8, Jan. 1973, pp. 2435 and 2436.

"LISA—Plastics", Mobay Chemical Corporation, KL 47.310e, 1/10/1983.

Baur et al., "Fluorescence-Activated Liquid Crystal Display", Applied Physics Letters; vol. 31, No. 1, 7/1/1977.

Dim Light is no Turnoff for Fluorescence-Activated LCD, by Martin Bechtler & Hans Kruger, pp. 113-116, Electronics/Dec. 8, 1977.

*Primary Examiner*—Rolf Hille
*Assistant Examiner*—Minhloan Tran
*Attorney, Agent, or Firm*—Daniel R. Collopy; Vincent B. Ingrassia; William E. Koch

[57] ABSTRACT

Known LCD devices of the type having an upper polarizer (36), a liquid crystal cell (28), a lower polarizer (38) and a reflector (42) and working using ambient light to provide illumination lose contrast because the light passes twice through both polarizers. By providing a layer of light concentrating plastic (44) between the upper polarizer (36) and the LCD cell (28), light emitted from bevelled edges (48) of an aperture (46) in the plastic is directed towards the cell and reflector directly, without passing through the upper polarizer (36). This is in addition to the normal ambient light passing through the front polarizer. This increases the intensity of light reaching the observer (20) and thus the contrast of the display.

15 Claims, 3 Drawing Sheets

ENHANCED CONTRAST LIQUID CRYSTAL DISPLAY DEVICE

BACKGROUND OF THE INVENTION

1. Field of the Invention

The present invention relates to electrical optical displays, especially for displays which are based on the principal of the twisted nematic (TN) liquid crystal cell, and in particular, to a nematic liquid crystal display (LCD) device which provides improved contrast in a wide range of viewing conditions.

2. Description of the Prior Art

To begin, it would be beneficial to briefly review the construction and operation of a typical twisted nematic (TN) LCD. Heretofore, field effect LCD cells, such as those of the TN type, have been constructed typically as follows. Referring to FIG. 1, a liquid crystal material 10 having a positive dielectric anisotropy is interposed between an upper 12 and a lower 14 parallel glass substrate, with the molecules of the liquid crystal material parallel with the upper and lower substrates and twisted 90 degrees therebetween. Such an LCD cell is disposed between a pair of polarizers (16 and 18) with polarizing axis intersecting with each other at right angles. With this typical construction, light impinging upon a device from light source 15 is first polarized linearly by one of the polarizers 18, then its polarized plane is rotated 90 degrees by the liquid crystal's molecules in a twisted arrangement, and finally, light transmits through the other polarizer 16 to be observed by viewer 20. Where transparent electrodes 19 formed with a pattern of a letter, digit, or other symbols are disposed on the inner surface of the upper and lower substrates, and are impressed with a voltage greater than the threshold voltage of the device, the liquid crystal molecules will be arranged in substantially the vertical direction or in the direction of the field. Under these conditions, the polarized plane of incident light will not be rotated by the liquid crystal molecules. Thus, the incident light will be intercepted by the second polarizer 16 creating a dark symbol on a light background. The pattern thus can be displayed by controlling the direction of the liquid crystal medium within the LCD cell to yield the rotation or non-rotation of the plane of polarization.

While this type of arrangement has worked well in sunlight, in darkness, the typical LCD device has been difficult to see due to losses from surface reflection and transmission coefficients. To solve this problem in darkness, typical LCD devices are illuminated with additional light to permit the viewer to see the display. This can be accomplished by flooding the LCD with light from the front or back. However, lighting the LCD under dim or dark conditions requires additional electronics and increases current usage to illuminate the display.

Continuing with our example of the typical TN LCD, in some cases, only light from the viewer's side is available. Referring to FIG. 2, there is shown a side view of a TN LCD device of FIG. 1. In order to achieve a good contrast in a LCD device operated by reflection, a reflector 22 with high reflective capacity and also with suitable diffuse scattering power is situated beneath the lower polarizer to reflect the light from the viewer side back to the viewer's eye, 20.

Having discussed the basic operating properties of a TN LCD, it is important to briefly describe its uses. With the advance of technical innovation, the use of LCDs has grown. LCDs have significant advantages over light emitting diodes in that they essentially act as a capacitor by holding the impressed voltage (i.e. field effect) and consume almost no power. For this reason, LCDs are being used in watches and as readouts for hand held computers, electronic games or small portable devices In the design of electronic equipment, the general intent has been to reduce the overall size of the equipment. This is particularly true in the selective call radio paging receiver market where recently designed "pagers" are now available that can be carried in a shirt pocket. Such a design typically includes a rectangular parallel piped plastic housing that includes a single printed circuit board with appropriately attached electronic components. The housing is typically not much wider than the thickness of the printed circuit board and components. Therefore, if a visual display is to be installed on a pager, a low profile assembly is usually required. To achieve this low profile assembly the additional lighting to illuminate the LCD under dim conditions requires considerable mechanical design work, power drain, and hence increased costs.

Although older paging receiver designs convey the received message to the user mainly upon receipt, recently developed paging receiver designs store a received message in the pager for later retrieval by the user Therefore, it becomes necessary to inform the user that a message has been received This is typically accomplished by sounding an alert tone, flashing light, actuating a vibrator, or in the case of a digital display pager, causing a predetermined symbol to appear on the paging receiver's display. If a visual indication of the message is desired, the current drain of the light source becomes critical because paging receivers typically have very limited battery capacity Therefore, to reduce battery drain while maintaining the output light intensity at an acceptable level, it would be desirable to provide a visual display that minimizes the amount of current drain from the battery while maintaining adequate legibility of the message on the display under all viewing conditions.

To assure adequate legibility, there must be adequate visual contrast between the alphanumeric characters that comprise the message and the background against which they are viewed.

SUMMARY OF THE INVENTION

The present invention has been developed for the purpose of overcoming the problems of prior art twisted nematic LCD device systems. Accordingly, the invention has as its object a device for providing a liquid crystal generated display image having enhanced contrast under normal or bright ambient lighting conditions as well as under dim or blackout ambient lighting conditions The invention is based on the fact that although the image in conventional LCD systems is formed, as described above, by the absence of light being transmitted through to the observer, i.e. a dark image, the contrast of this image depends on the brightness of the surrounding background Thus, by increasing the amount of light transmitted in the background of the image through the LCD cell to the observer, the contrast of the displayed image will be enhanced.

Accordingly, the invention provides a liquid crystal display (LCD) device comprising an LCD cell formed of a layer of optically nematic liquid crystal material disposed between two transparent substrates, the substrates having at least one pair of electrodes disposed on opposite interior surfaces thereof; first polarizing means situated on one side of said LCD cell; second polarizing means situated on an opposite side of said LCD cell to said first polarizing means and having its axis of polarization orthogonal to that of said first polarizing means; reflector means situated on an opposite side of said second polarizing means to said LCD cell for reflecting light back through said second polarizing means; and light providing means situated between one of said polarizing means and said LCD cell for providing light directed towards said reflector means.

In a preferred embodiment of the invention, the light providing means comprises a layer of light concentrating plastics material having an aperture therein surrounding at least said display electrodes and whose inner sides direct light emitted thereby towards said reflector means.

The light concentrating plastics material is preferably of the type that absorbs ambient light incident upon it and emits long wavelength fluorescent light which is substantially internally reflected in said plastics material so as to be emitted at edges thereof and may be of the type known as LISA material developed and sold by the Mobay Chemical Corporation. The use of such a material in conjunction with a LCD display is discussed in an article by Bechtler et.al., entitled "Dim Light is No Turnoff for Fluorescence-Activated LCD" which appeared in Electronics, Dec. 8, 1977. Even in this case, however, transmission losses occurred from both polarizers due to the placement of the fluorescent material.

The aperture in the light concentrating plastics material is preferably of such a size and shape as to allow light passing from the reflector means through said second polarizing means and a display area of said LCD cell to pass therethrough towards said first polarizing means.

In a preferred embodiment, the inner sides of the aperture are bevelled, preferably at an angle between 30° and 45° from normal, to direct light towards the reflector means and may also have a roughened surface so as to diffuse light emitted thereby.

DETAILED DESCRIPTION OF A PREFERRED EMBODIMENT

Figure 3:
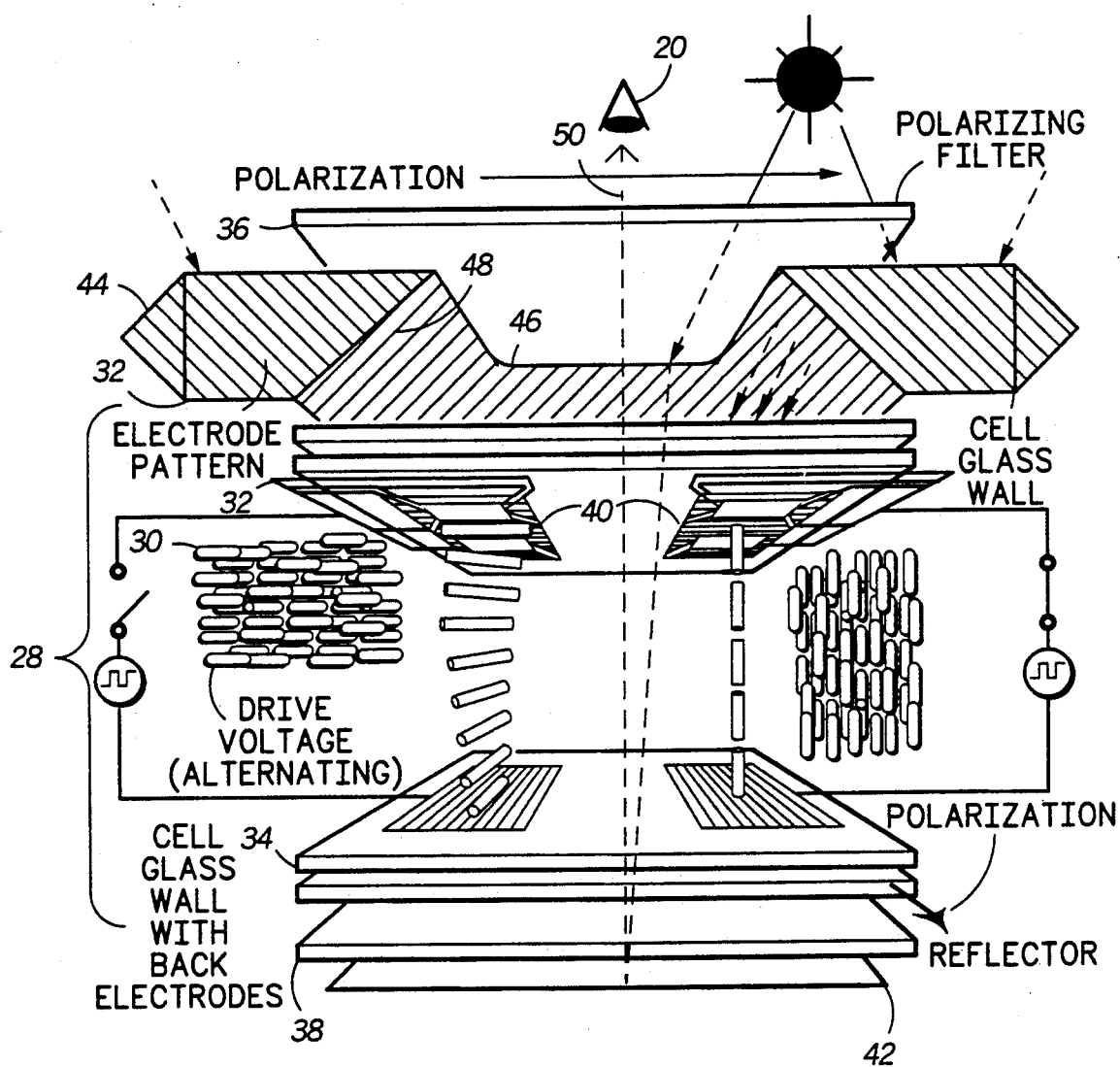
FIG. 3 is an exploded perspective view of an LCD device according to the invention.

FIG. 3 shows an exploded perspective view of an LCD device 8 incorporating the various features of the invention. The elements are shown exploded away as though they were separate elements It will be understood, however, that these elements are physically coupled together to form a unified display device.

The LCD device 8 of FIG. 3 includes a LCD cell 28 comprising a liquid crystal material having a positive dielectric anisotropy interposed between a first 32 and a second 34 parallel glass substrate with the molecules 30 of the liquid crystal material parallel with the first and second glass substrates and twisted 90 degrees therebetween. The visual display indicia 40 are defined by means of conductive, light transmitting electrodes deposited on the inner surfaces of the substrate (i.e. the surface exposed to the liquid crystal solution deposed between the substrates).

For the purposes of the present invention, the term "indicia" encompasses and includes, but is not limited to, range marks, bars, bar sections, numerals, letters, symbols, icons, or any other form of visual indications. The numerals or letters need not be of a continuous nature, in fact, the numerals may be of the well known 7-segment type in which selective energization of the segments and various combinations produces numerals from zero to 9, or the alphanumeric type which produces alphanumeric characters. For clarity and brevity the remaining discussion will reference a seven segment display as an indicia.

Figure 1:
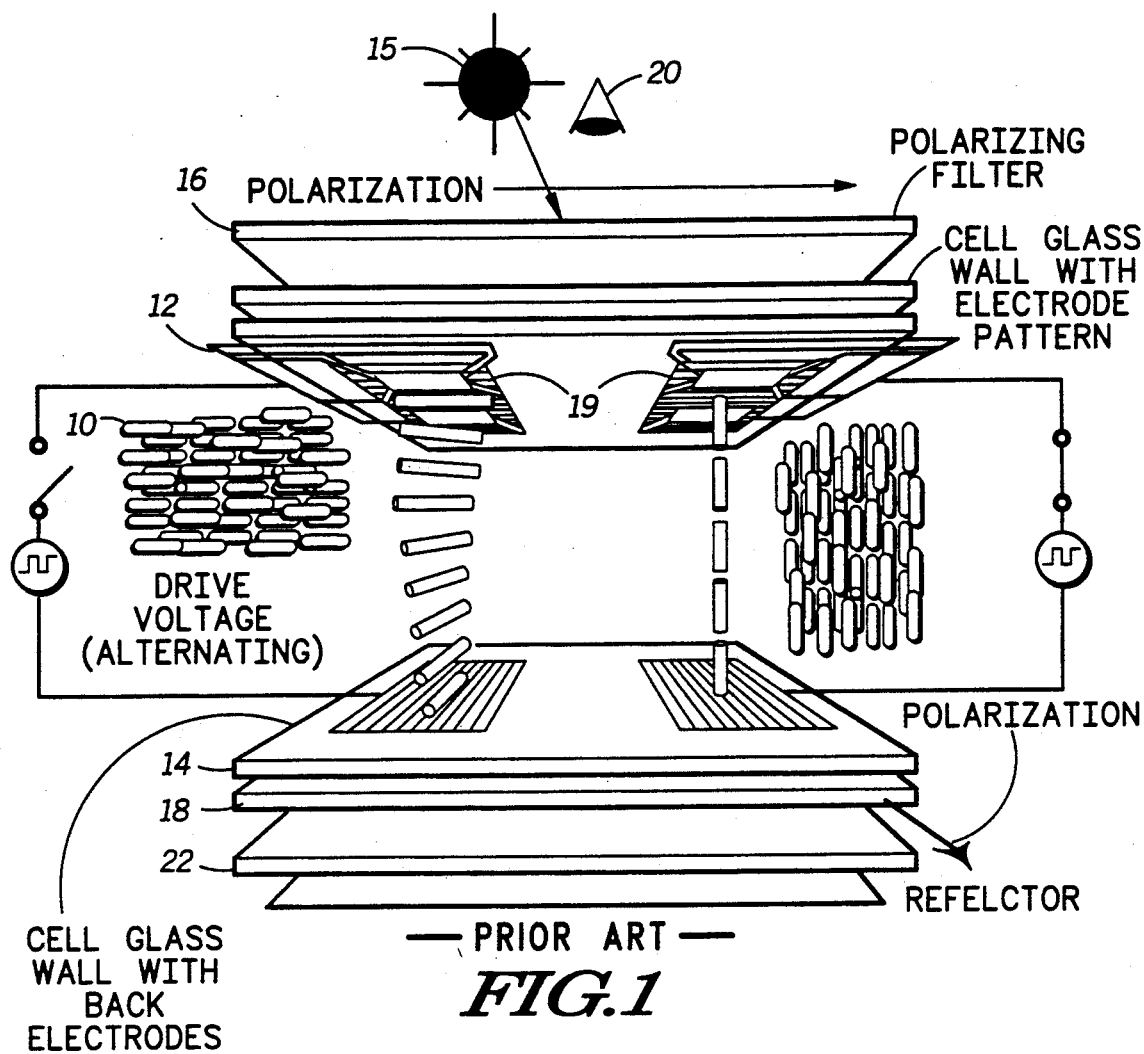
FIG. 1 shows an exploded perspective view of a typical twisted nematic LCD device.

Continuing with the explanation of FIG. 3, the LCD cell 28 is disposed between a first polarizer 36 and a second polarizer 38 which have polarizing axes which would intersect with each other at right angles. A reflector 42 is positioned adjacent the second polarizer 38 so as to reflect light back through the polarizer 38 through the LCD cell 28 to the first polarizer 36 and the observer 20. It will be appreciated that so far the LCD device 8 is similar to that of FIG. 1.

Figure 2:
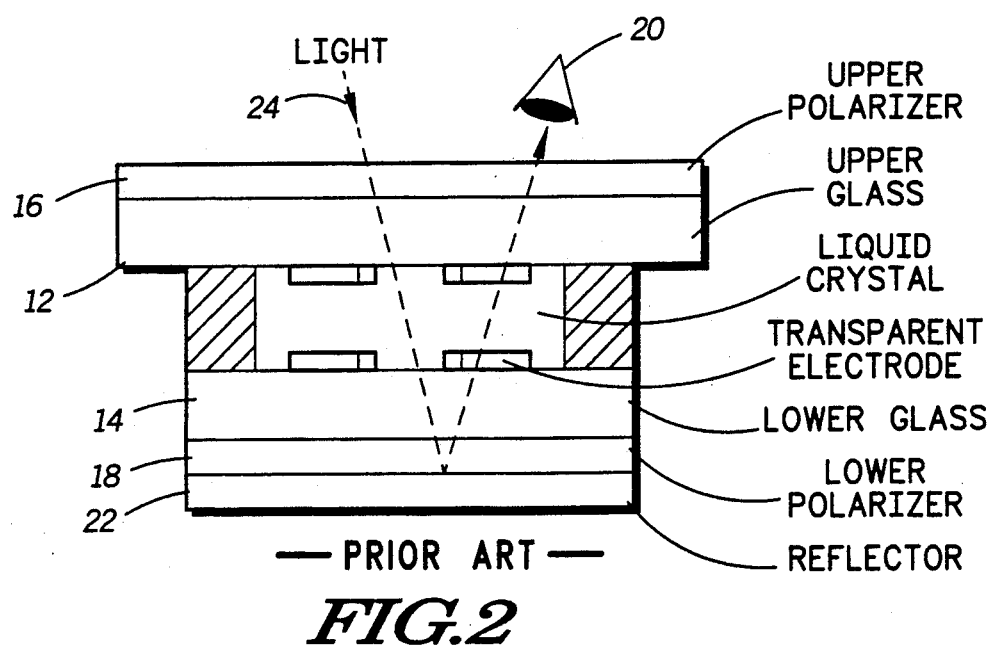
FIG. 2 shows a side view of the LCD device of FIG. 1.

As will be appreciated, light incident on prior art devices must pass through the first polarizer, the LCD cell and the second polarizer before being reflected by the reflector and passing once again through the second polarizer, LCD cell and first polarizer before reaching the observer 20. This is shown in FIG. 2 by dotted line 24. Thus the luminous transmission of the device is given by $$R_{OBS} = R_{INC} - [2\ P_1 + 2\ P_2]$$

where $R_{OBS}$ is the intensity of light received by the observer, $R_{INC}$ is the intensity of ambient light incident on the device and P1 and P2 are the absorption factors of the first and second polarizers respectively.

As can be seen in FIG. 3, the invention provides means 44 for providing light within the device 8. The means 44 are formed of a sheet of light concentrating plastics material, of a type to be described further below, having an aperture 46 therein whose inner sides 48 are bevelled at an angle of between 30° to 40 ° to the normal so as to emit light traveling within the plastics material towards the reflector 42. The means 44 are positioned between the LCD cell 28 and the first polarizer 36. This means that the light emitted by the means 44 only travels through the first polarizer 36 once, and not twice as in the prior art. This is shown by dotted line 50 in FIG. 3. Thus the luminous transmission of the device is:

$$R_{OBS} = R_{EMIT} - [P_1 + 2\ P_2] + R_{INC}$$

where $R_{EMIT}$ is the intensity of the light emitted by the plastics material 44. It can therefore be seen that for substantially similar values of $R_{INC}$ and $R_{EMIT}$, the intensity of light received, $R_{OBS}$, will be greater by a factor corresponding to the absorption of first polarizer 36. Results indicate that the luminous transmission of prior art devices is approximately 30% whereas that for the present invention is approximately 37.5%. The contrast improvement seen by the observer is substantial.

Referring back to the light concentrating plastics material used for the light providing means 44, this is comprised of a light concentrating plastic in which dye transparent polymers within the material have special optical properties. The material 44 absorbs direct or diffused light from the environment, transforms it to longer wavelengths, and emits it as a fluorescent light. Essentially, the transparent material 44 is constructed preferably from a transparent polycarbonate, although other transparent materials having special dye stuffs may also be suitable. The material includes a fluorescent material, preferably a low molecular weight polymer dye stuff. Sheets of various plastics containing such fluorescent dye stuffs are available from the Mobay Chemical Company and are known as "LISA" plastics. Further information on these plastics can be obtained from data sheets available from the Mobay Chemical Corporation and a description may also be found in an article entitled "Razzle-Dazzle Plastic" by Steven Ashley on pages 100-101 of Popular Science, Apr. 1986. "LISA" is an abbreviation for the German word "lichtsammeln" which means "light collecting". The LISA plastics absorb ambient light and emits it as long wavelength fluorescent light in the visible range. The outstanding characteristics of LISA material is that it follows the principles of total internal reflection. That is, if light is traveling in a media that has a higher index of refraction than that of the environment, and the light encounters a boundary between the median and environment, the light will be totally reflected at the boundary if the angled incident exceeds the critical angle. The angle of incidence and the critical angle are measured from a line drawn perpendicular to the boundary surface.

Due to the higher refractive index of the plastic material, the environment light is refracted on the surface of the plastic sheet. A part of the light is then absorbed by the dye stuff comprising the LISA plastic. After 9-10 seconds, the absorbed light energy is emitted as fluorescent light at random in the plastic sheet. The part of the emitted light which reaches the surface of the plastic/air medium with a smaller angle than the total reflection angle, is reflected and leaves the sheet. Approximately 75% of the emitted light is totally reflected, collected, and transmitted through the material in the general direction that is substantially parallel to the main surfaces of the sheet of material. In other words 75% of the light will be internally reflected by the main surfaces of the material such that it is transmitted into the environment through the edges of the sheet.

According to a preferred embodiment of the invention an aperture 46 is formed in the means 44 to provide edges 48 around the LCD cell. These edges 48 are bevelled to direct the emitted light towards the reflector means 42 but the bevel should be between 30° and 45° to the normal since, as will now be apparent, angles of less than 30° will result in total internal reflection and light will not be emitted. However an angle of less than 45° is desirable so as to increase the area of the inner side of the sheet and so increase the amount of light emitted thereby. The inner sides of the aperture may also have a roughener surface so as to diffuse light emitted thereby.

Since, as has been described, the LISA material acts as a collector or concentrator of light, it can also be used in the manner described above with an illumination device such as a bulb in low ambient light conditions. In this case, a bulb is positioned adjacent a portion of the material which collects light received from the bulb and emits it as fluorescent light in the visible range from the inner edges 48 of the aperture 46.

Figure 4A:
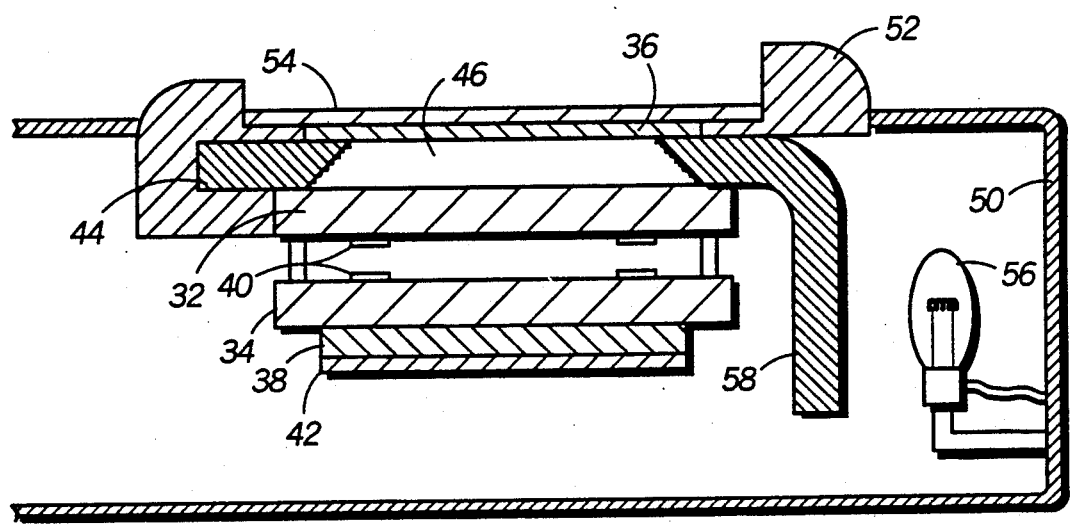
FIG. 4 illustrates, in cross section, the LCD device of FIG. 3 mounted in a housing for both ambient and self-contained lighting conditions.
Figure 4B:
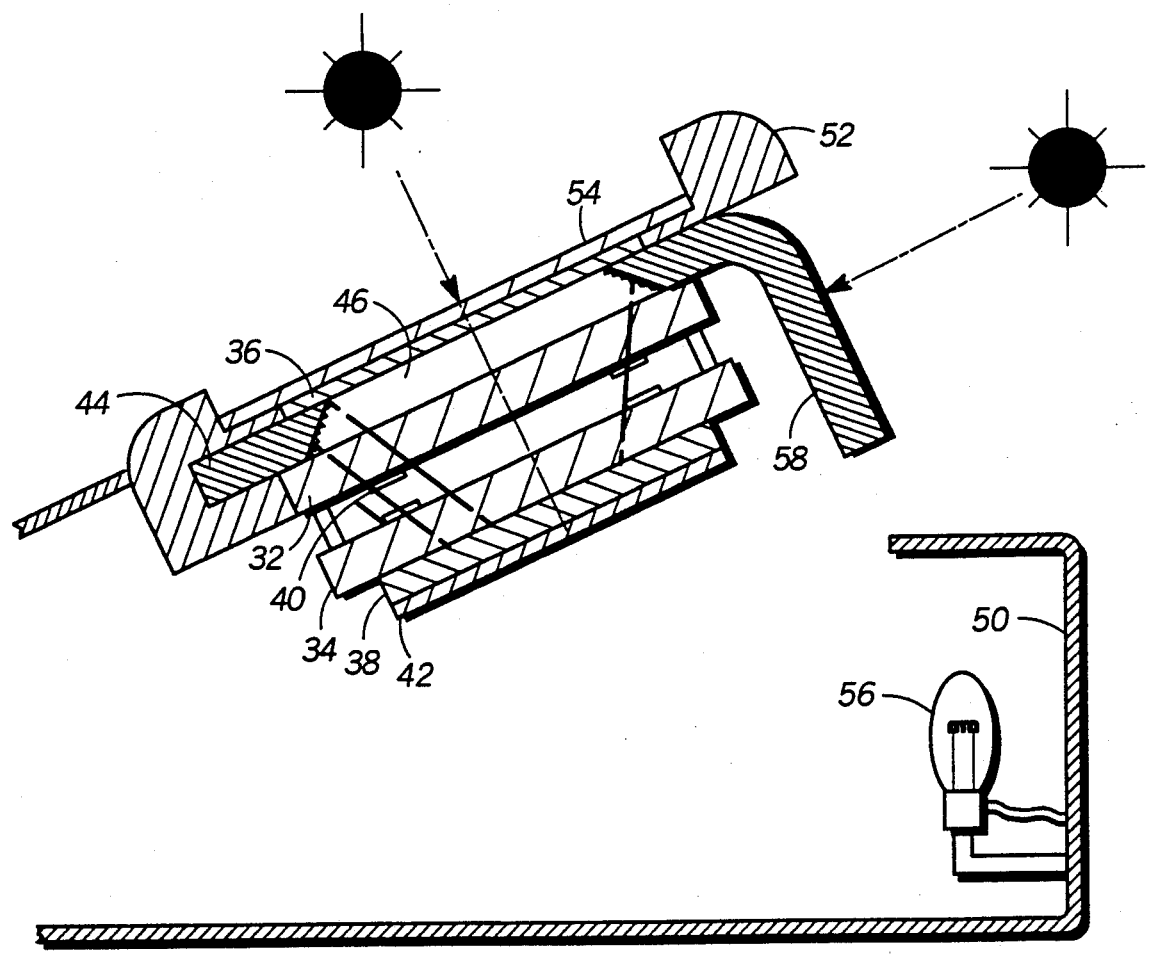

An LCD device such as this is shown schematically in FIG. 4 where the display may have two positions—one for high ambient light conditions as shown in FIG. 4(b) and one for low ambient light conditions—shown in FIG. (a). The main components of the device are similar to those of FIG. 3 and are similarly numbered in the drawing. It will be seen that the device is shown in a housing 50, which may, for example, be the housing of a calculator, a paging receiver or any other electrical product requiring an LCD display. The housing 50 includes a mounting 52 in which the LCD device is mounted and there is provided a lens 54 on the outside surface of polarizer 36 to protect it. Within the housing 50 is provided a light source 56 positioned in such a way as to illuminate a portion 58 of the light concentrating plastics material 44 when the device is in the position of FIG. 4(a). The portion 58 is contiguous with the portion of the material 44 having aperture 46 therein but is bent at right angles to it so as to present a surface to the bulb 56 for illumination thereby. This position is suitable for low ambient lighting conditions. The bulb 56 illuminates the face 58 of the light providing means 44. The light is collected and directed, as described above, to the inner edges 48 of the aperture 46 where it is emitted towards the reflector 42, thus providing the illumination required for the LCD device.

In a situation where there is a high level of ambient lighting, the LCD device within the mounting 52 is rotated upwards so as to provide a more comfortable viewing angle for the user. This rotation brings the surface 58 out of the housing 50 to a position where ambient light falls upon it providing illumination in a similar manner to that described above.

We claim:
1. A liquid crystal display (LCD) device comprising:
an LCD cell formed of a layer of optically nematic liquid crystal material disposed between two transparent substrates, the substrates having at least one pair of display electrodes disposed on opposite interior surfaces thereof;
first polarizing means situated on one side of said LCD cell;
second polarizing means situated on an opposite side of said LCD cell to said first polarizing means and having its axis of polarization orthogonal to that of said first polarizing means;
reflector means situated on an opposite side of said second polarizing means to said LCD cell for reflecting light back through said second polarizing means; and
light providing means situated between one of said polarizing means and said LCD cell for providing light directed towards said reflector means, said light providing means comprising a layer of light concentrating plastics material having an aperture therein surrounding at least said display electrodes and whose inner sides direct light emitted thereby towards said reflector means.

2. A liquid crystal display device according to claim 1 wherein said light concentrating plastics material upon said light concentrating plastics material and emits long wavelength fluorescent light which is substantially internally reflected in said plastics material so as to be emitted at edges thereof.

3. A liquid crystal display device according to claim 2 wherein said light concentrating plastics material is of type knows as LISA material developed and sold by the Mobay Chemical Corporation.

4. A liquid crystal display device according to claim 1 wherein said aperture in said light concentrating plastics material allows light passing from the reflector means through said second polarizing means and a display area of said LCD cell to pass therethrough towards said first polarizing means.

5. A liquid crystal display device according to claim 1 wherein said inner sides of said aperture in said light concentrating plastics material are bevelled at an angle to direct light towards said reflector means.

6. A liquid crystal display device according to claim 5, wherein the bevel angle of said inner sides o said aperture is between 30° and 45° from normal.

7. A liquid crystal display device according to claim 1 wherein said inner sides of said aperture have a roughened surface so as to diffuse the light emitted thereby.

8. A liquid crystal display device according to claim 1 further comprising an illumination device arranged to illuminate said layer of light concentrating plastics material when the ambient lighting conditions are too low to provide sufficient light.

9. A liquid crystal display device according to claim 8 wherein said illumination device comprises a lamp mounted within a housing containing said liquid crystal display device.

10. A liquid crystal display device according to claim 8 wherein said illumination device is arranged to illuminate a portion of said layer of light concentrating plastics material remote from said LCD cell.

11. A liquid crystal display device according to claim 10 which is movable within a housing between a first position suitable for use in high level ambient lighting conditions and a second position in which the portion of said layer of light concentrating plastics material to be illuminated is adjacent said illumination device.

12. An electronic device comprising:
an illumination device;
a liquid crystal display (LCD) device comprising:
an LCD cell formed of a layer of optically nematic liquid crystal material disposed between two transparent substrates, the substrates having at least one pair of display electrodes disposed on opposite interior surfaces thereof;
first polarizing means situated on one side of said LCD cell;
second polarizing means situated on an opposite side of said LCD cell to said first polarizing means and having its axis of polarization orthogonal to that of said first polarizing means;
reflector means situated on an opposite side of said second polarizing means to said LCD cell for reflecting light back through said second polarizing means; and
light providing means for providing light directed towards said reflector means, said light providing means comprising a light concentrating plastics material comprising a first portion situated between one of said polarizing means and said LCD cell and a second portion remote from said LCD cell and proximately located to said illumination device to receive light therefrom, said first portion having an aperture therein surrounding at least said display electrodes and whose inner sides direct light emitted thereby towards said reflector means; and
a housing comprising an aperture for viewing at least said display electrodes, said illumination device and said LCD device mounted within said housing.

13. The electronic device of claim 12 wherein said housing further comprises an adjustable portion having a first position and a second position wherein said adjustable portion in said first position admits high level ambient light into the housing proximate to said second portion of said light concentrating plastics and said adjustable portion in said second position prevents light from said illumination device to radiate outside said housing.

14. The electronic device of claim 12 wherein said electronic device is a selective call radio paging receiver.

15. The electronic device of claim 12 wherein said electronic device is a portable computing device.

* * * * *